July 20, 1965  J. L. COAKLEY ETAL  3,195,365
FRICTION DRIVE APPARATUS
Filed April 24, 1961  8 Sheets-Sheet 1
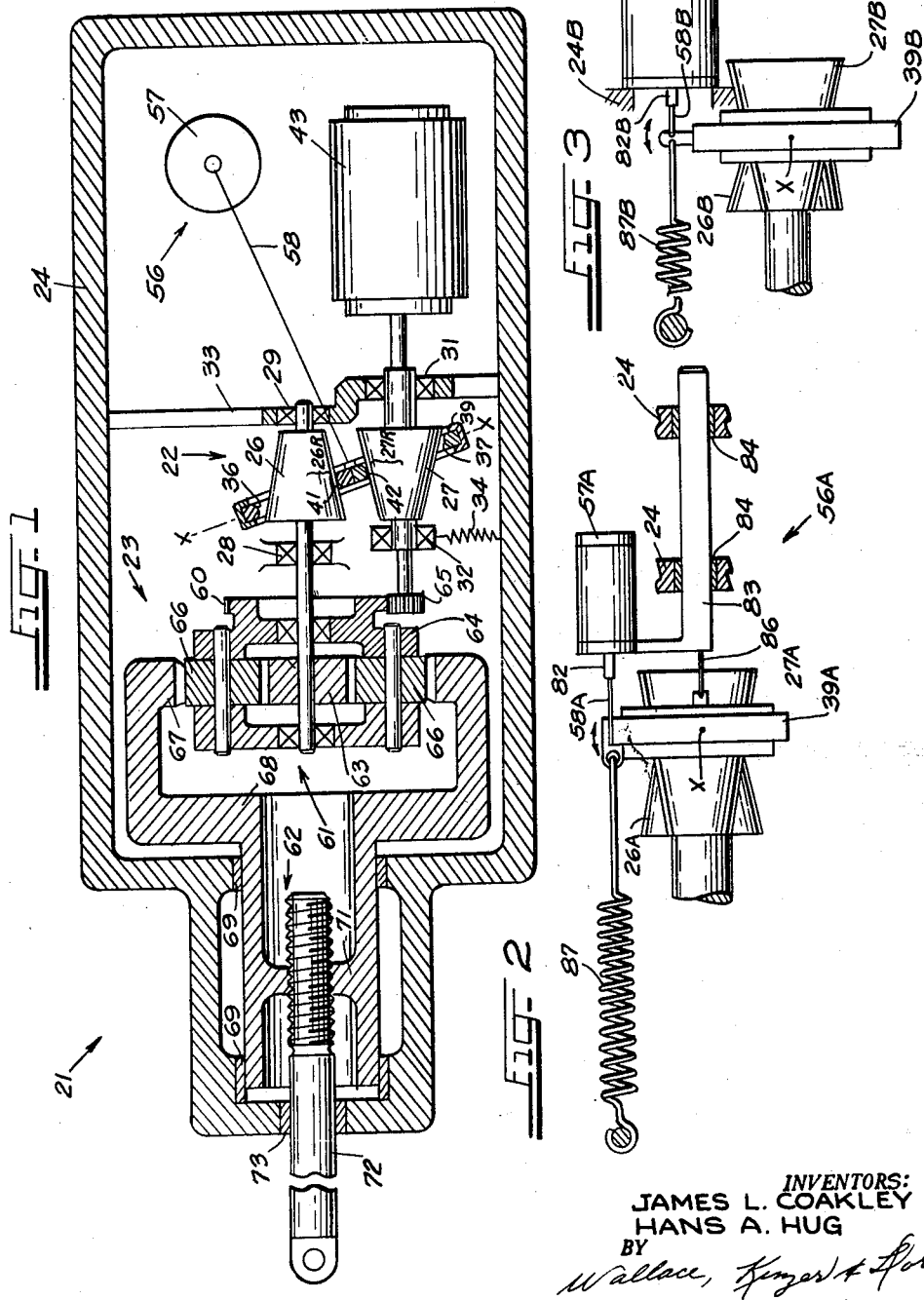
INVENTORS:
JAMES L. COAKLEY
HANS A. HUG
BY
Wallace, Kenyon & Horn
ATT'YS.

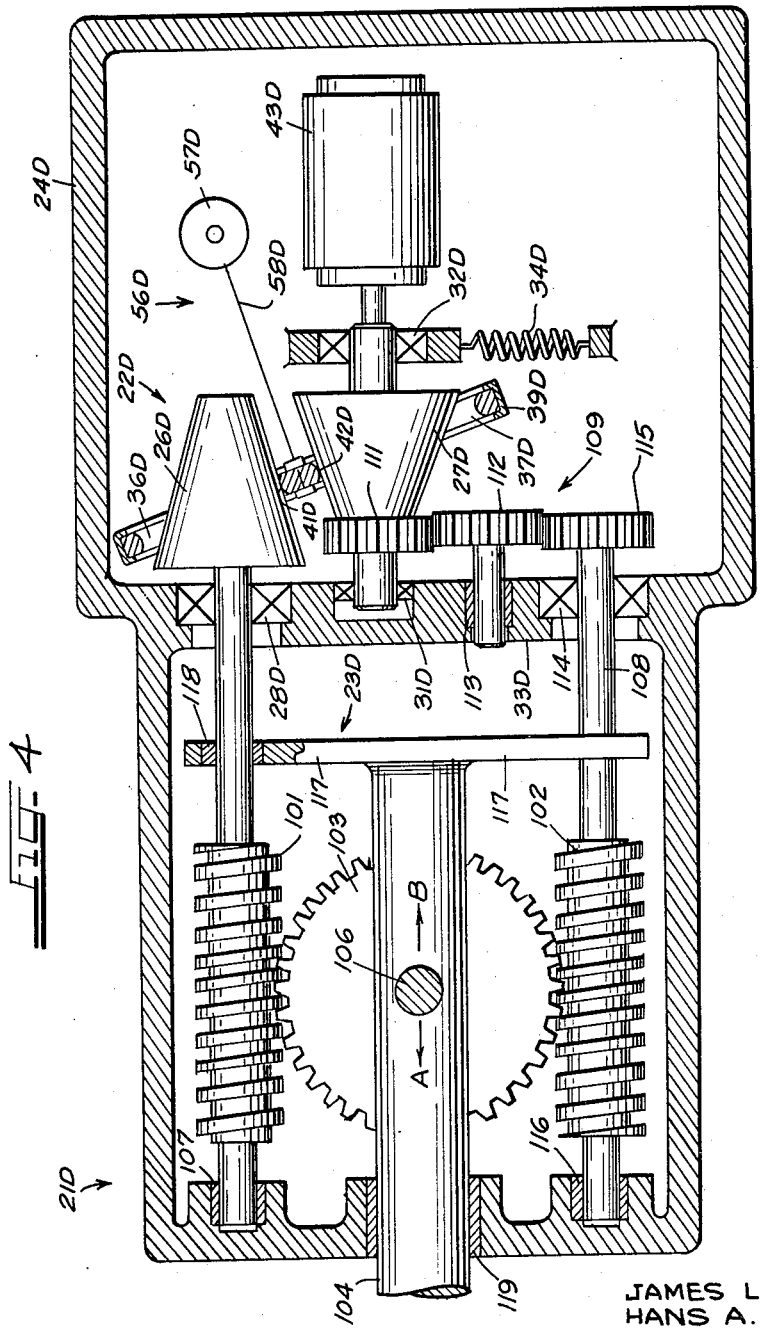

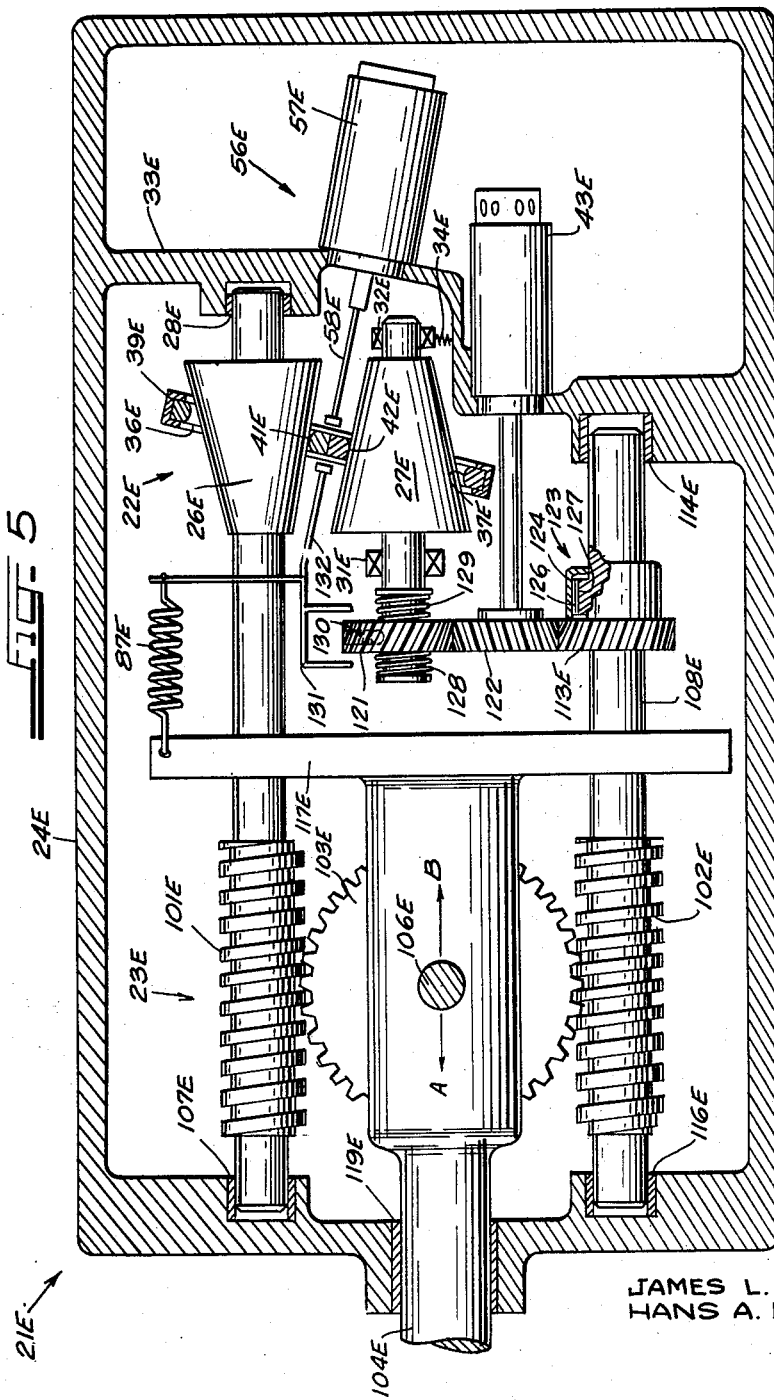

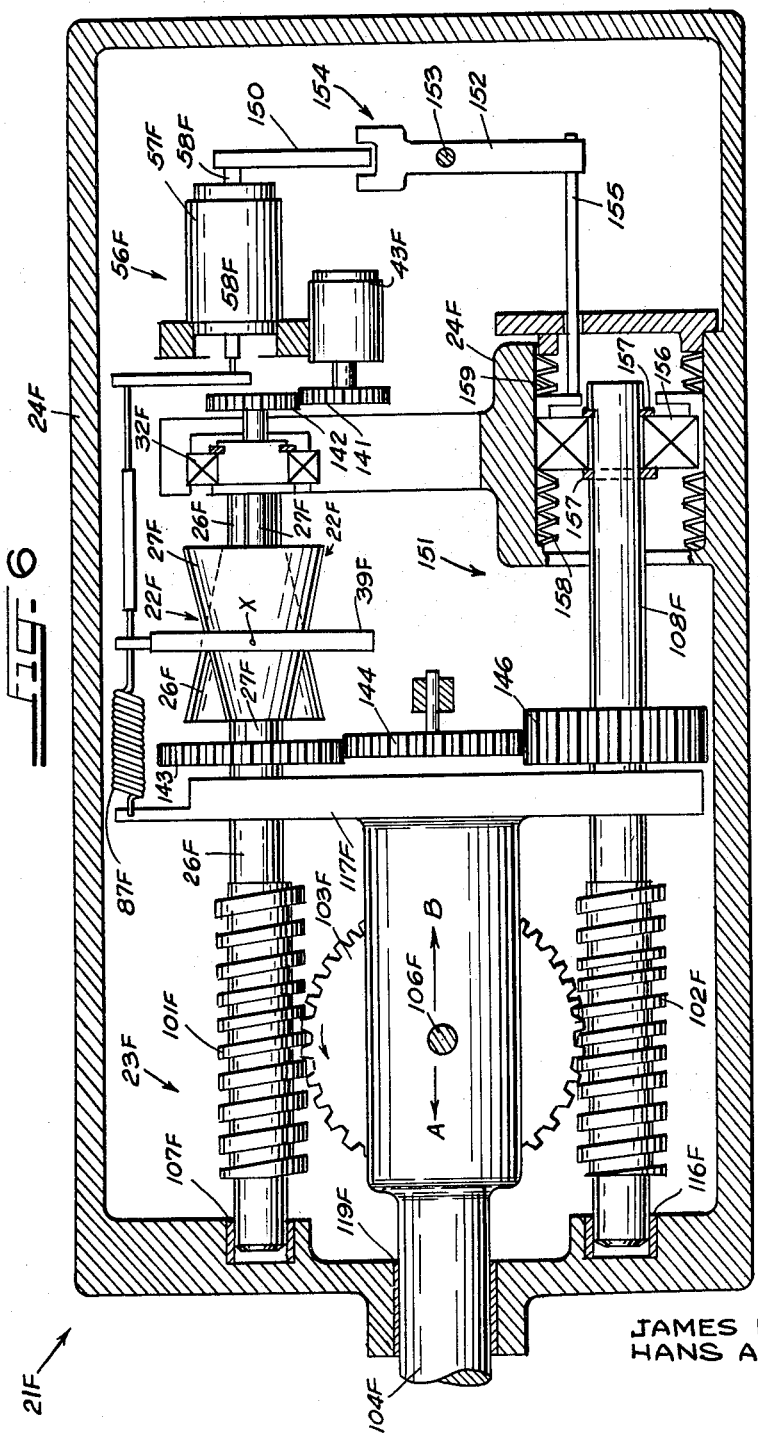

July 20, 1965                J. L. COAKLEY ETAL                3,195,365
                           FRICTION DRIVE APPARATUS
Filed April 24, 1961                                      8 Sheets-Sheet 5
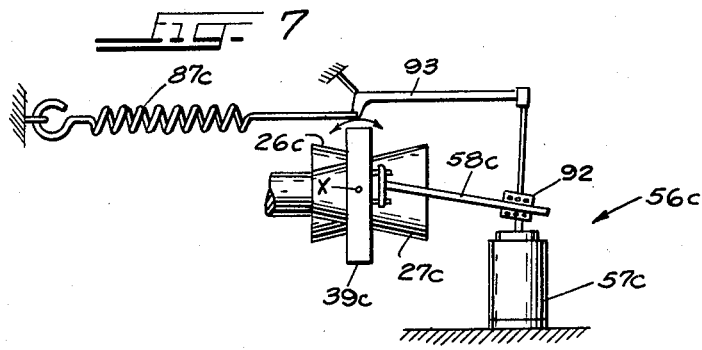
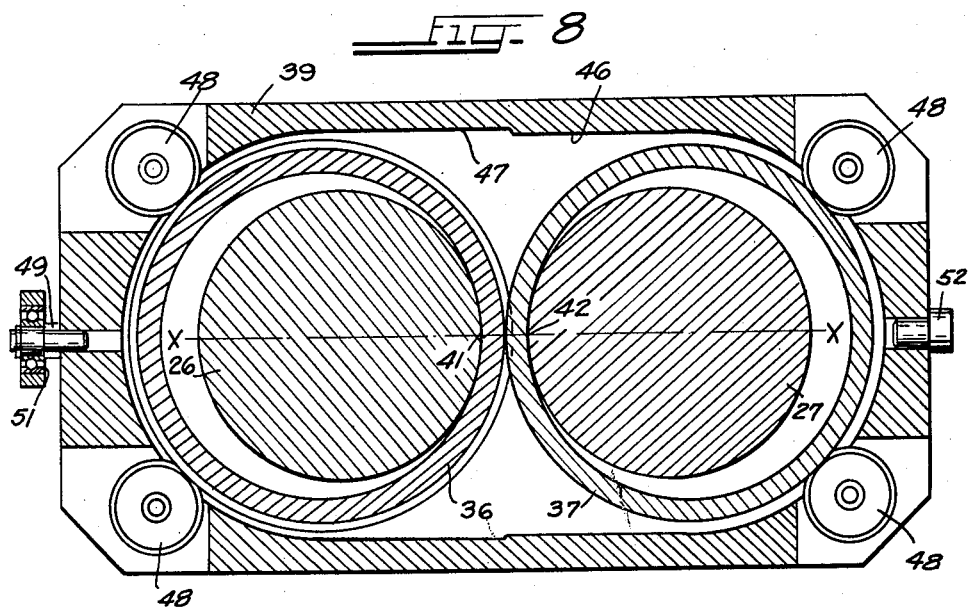
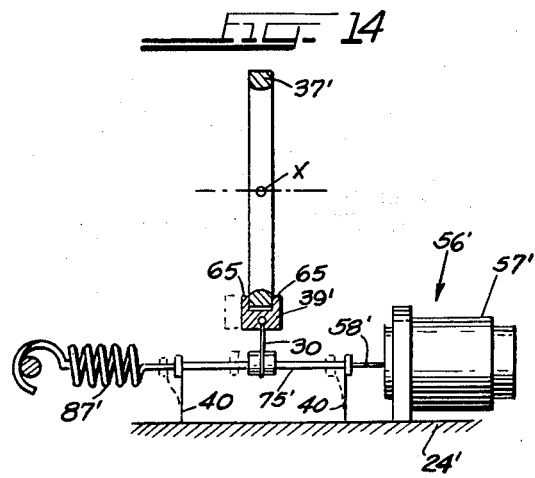
INVENTORS:
JAMES L. COAKLEY
HANS A. HUG

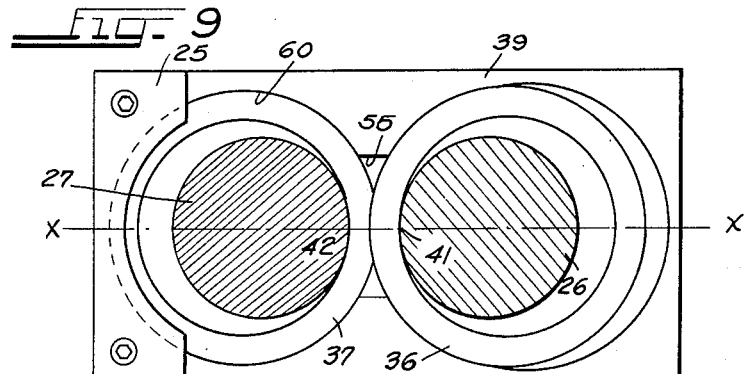
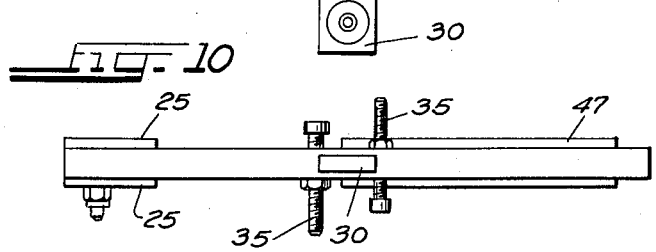
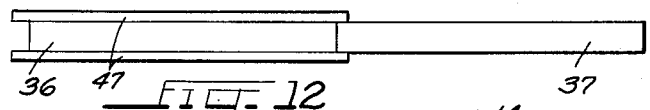
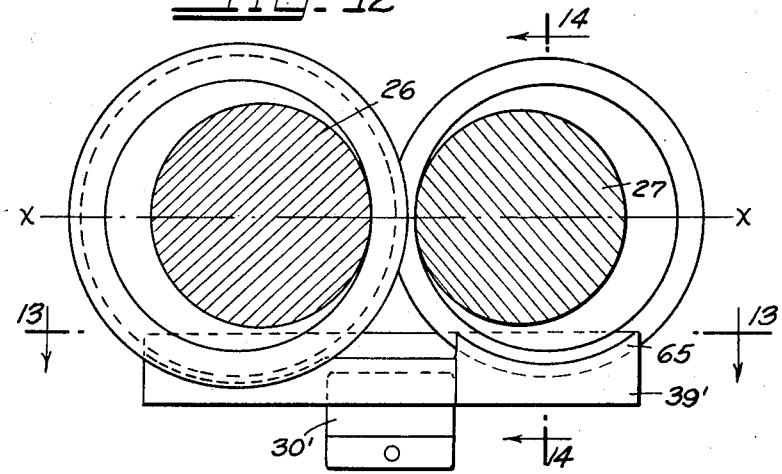
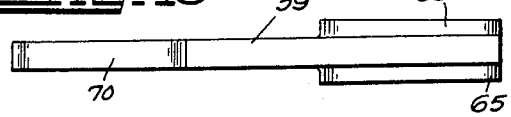

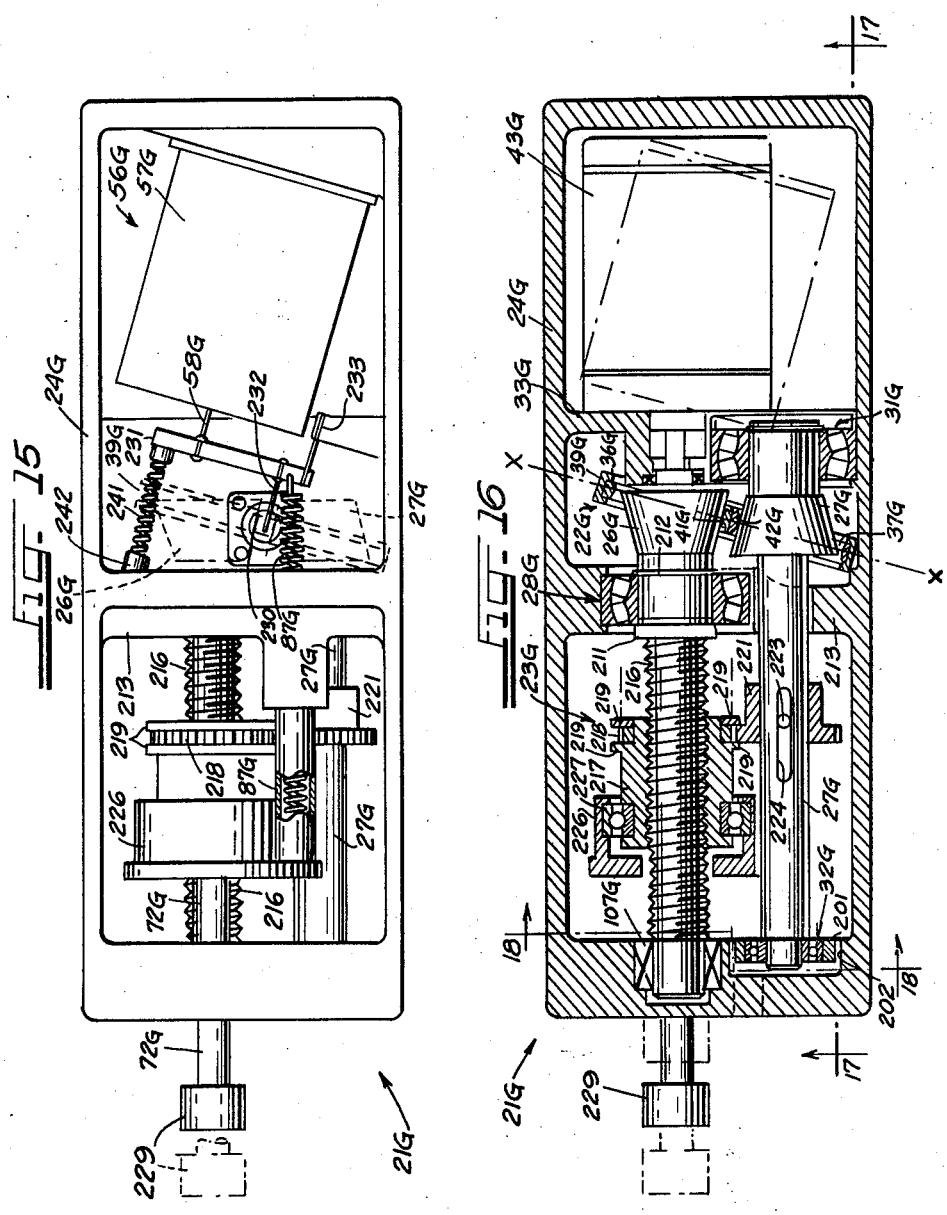

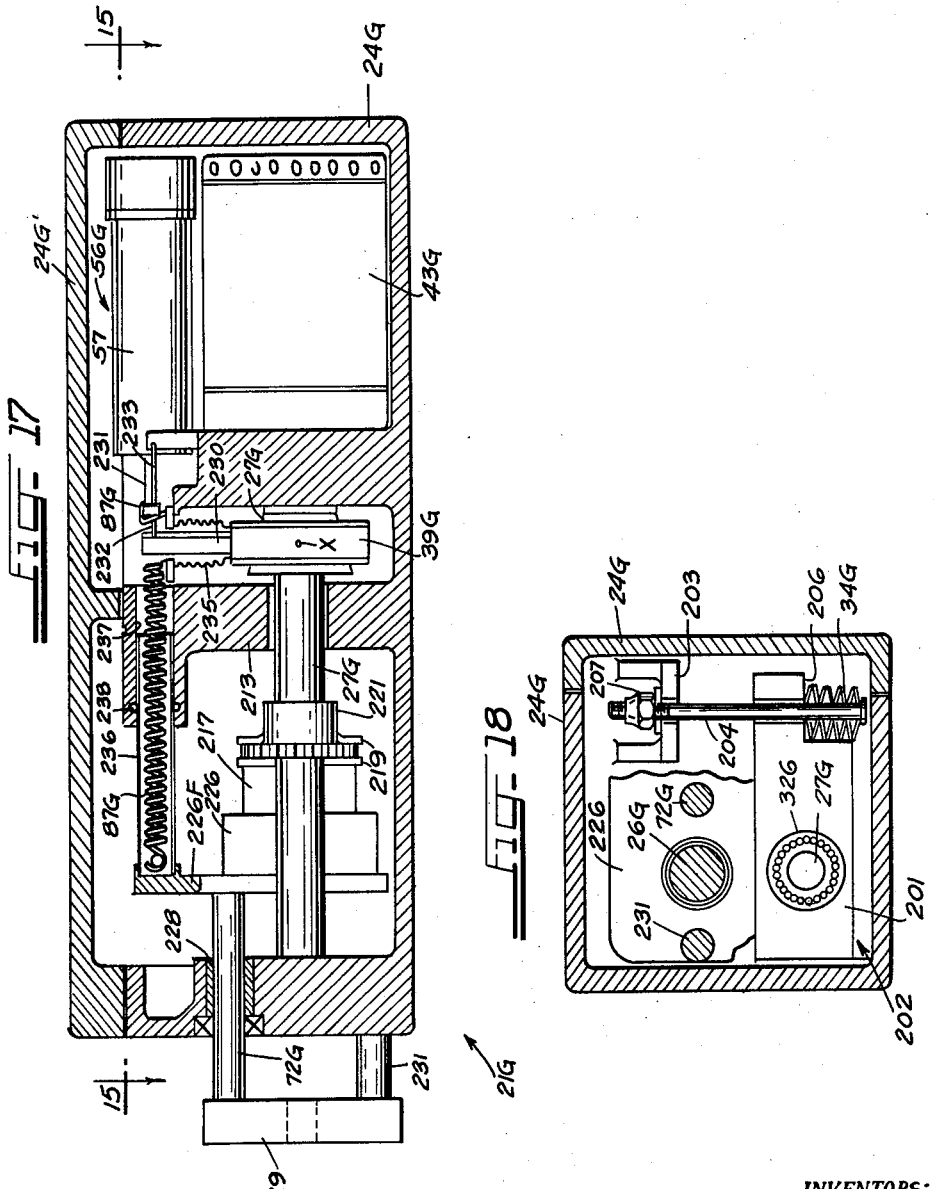

United States Patent Office 3,195,365
Patented July 20, 1965

---

3,195,365
FRICTION DRIVE APPARATUS
James L. Coakley, Woodland Hills, Calif., and Hans A. Hug, Norwood, Mass., assignors to American Brake Shoe Company, New York, N.Y., a corporation of Delaware
Filed Apr. 24, 1961, Ser. No. 105,044
16 Claims. (Cl. 74—388)

This invention relates to a friction drive apparatus for converting rotary motion and torque into axial displacements and thrust. More particularly, this invention relates to apparatus for increasing the torque and thrust output of friction drive apparatus of the kind in which a ring or roller member is engaged with the periphery of a rotating shaft and is tiltable about the area of engagement with the shaft to provide axial movement of the ring or roller member as a consequence of rotation of the shaft.

In the co-pending applications of Hans A. Hug, Serial No. 842, and Joseph M. Davin and Hans A. Hug, Serial No. 841, now Patent No. 3,043,149, both filed January 6, 1960, there are disclosed a number of friction drive arrangements of the aforesaid kind for converting rotary motion and torque into axial displacement and thrust. Thus, in application Serial No. 842 there is illustrated and described a friction drive arrangement wherein a pair of counter-rotatable shafts are disposed in closely spaced and parallel relation, and wherein individual rollrings, each having an internal diameter somewhat larger than the external diameter of a shaft, encircle respective ones of the shafts. Each rollring is biased to a position wherein a portion of the inner periphery of the rollring is frictionally engaged with the portion of the outer periphery of its respective shaft, and the rollrings are further mounted for rotation within a deck member. So long as the rings are disposed substantially perpendicular to a plane passing through the center lines of the two shafts, the portions of the rings engaged with the shafts traverse circular paths about the periphery of the shafts during rotation of the shafts and the rings and deck member remain at a fixed axial position with respect to the shaft. However, upon tilting the rollrings about an axis passing through the areas of engagement with the shafts, the portions of the rings engaged with the shafts are caused to traverse a helical path about the peripheries of the shafts, and the rings are thereby moved axially of the shafts in a direction dependent upon the direction of rotation of the shafts and the angle at which the rollrings are tilted. By reason of the friction developed between the engaged portions of the rollrings and the shafts, a portion of the radial torque applied to the shafts can be converted to an axial thrust exertable directly on a load device by the rings and deck member during such axial movement. In such an arrangement, the maximum magnitude of the thrust thus made available is determined by the force with which the rings and shafts are engaged with one another and the coefficient of friction between the rings and shafts. Thus, for a friction drive arrangement of this kind to be capable of exerting large axial thrusts, such as thrusts of 500 pounds or larger, it may be necessary to have resort to rather bulky and heavy apparatus.

It is therefore a primary object of this invention to reduce the overall size of friction drive apparatus of the general kind described and yet obtain larger axial thrusts than have heretofore been possible.

In the aforesaid application Serial No. 841 there is disclosed a friction drive apparatus which utilizes parallel shafts and encircling rollrings as outlined hereinabove. However, the counter-rotatable shafts of the friction drive apparatus disclosed in application Serial No. 841 are formed with complemental but oppositely disposed conical contours in the portions to be engaged by the rollrings. Thus, the larger diameter end of the conical portion of one shaft is immediately adjacent the smaller diameter end of the conical portion of the other shaft, and vice versa. Additionally, the rollrings are engaged with one another at their outer peripheries in the portions disposed between the shafts so as to afford a drive means between the shafts, whereby one shaft can be rotated as a consequence of the torque applied to the other shaft. As in the first mentioned friction drive apparatus noted hereinabove with reference to application Serial No. 842, tilting of the rollrings about the areas of engagement with the shafts is effective to cause the rollrings to be frictionally driven in an axial direction along the shafts. Since the relationship between the radii at which the areas of engagement of the rollrings act on the respective shafts is continuously varied by such axial movement of the rollrings along the shafts, any selected output speed of rotation of one shaft can be obtained with a given speed of rotation of the other shaft.

The present invention utilizes a differential in the speeds of rotation of the shafts in a friction drive apparatus incorporating conical shafts as aforesaid to obtain an increase in the torque available from the driven shaft and convert such increased torque into an axially directed thrust; and such constitutes a specific object of this invention.

In accordance with one form of the present invention planetary gearing is operatively connected for drive by the respective conical shafts to produce an output torque as a function of a differential between the speeds of rotation of the respective shafts, and the output torque is in turn converted to an axially directed thrust through a power screw mechanism.

In accordance with another form of the present invention a pair of worms comprising a part of a worm gear mechanism are connected for drive by the conical shafts, and the worms are effective to impart axial motion to a worm wheel interposed therebetween whenever the worms are rotated at different speeds by the conical shafts.

In another form of the present invention the mechanism for converting the differential in the speeds of rotation of the shafts to an axial thrust may take the form of a quite simple screw and nut mechanism in which one shaft directly drives a screw spindle. A nut is threaded on the screw spindle and is adapted to be rotated by the other shaft. So long as the nut and screw spindle are rotated at the same angular velocity the nut remains at the same axial position on the screw spindle. However, should the conical shafts be rotated at different speeds, the nut rotates at a different angular velocity than the screw sprindle, whereupon the nut is moved axially in a direction dependent upon the relative speeds of rotation of the conical shafts.

In each of the above-noted torque converting mechanisms a very substantial mechanical advantage is obtained through the planetary gear, worm gear and screw spindle and nut mechanisms employed so that the relatively low torque output of the conical shafts is available as a quite large axial thrust in the respective axially movable members of each form of the torque converting mechanism. And to incorporate the foregoing mechanisms for converting rotational torque to axial thrust in novel friction drive apparatus of the general kind described constitutes further specific objects of the present invention.

In the forms of the invention utilizing the torque converting mechanisms as aforesaid for multiplying the torque output of the conical shafts and converting such multiplied torque to an axial thrust, the respective screw, worm wheel or nut may function as or be connected to an output member for transmitting an axial thrust to a load device. In a neutral position of the rollrings, or other means affording a friction drive between the shafts, the rollrings or drive means traverse a circular path on the peripheries of the conical shafts in the mid portions thereof and said shafts rotate at equal speeds. In such neutral position the friction drive apparatus is in a state of equilibrium wherein no axial motion is imparted to the output member. A control mechanism may preferably be utilized to impart a selected amount of tilt to the rollrings, or other means affording a friction drive between the conical shafts, to move the rollrings or drive means from the neutral position and thereby vary the respective speeds of rotation of the shafts and thus produce an axial displacement in the output member.

It is another object of this invention to sum up the axial movement of the output member and apply a second force of a magnitude dependent upon the extent of the axial movement of said output member in opposition to the tilting force imparted by the control mechanism. Thus, the force developed by axial movement of the output member continuously increases in magnitude with the increasing displacement of the output member and is effective to progressively overcome the force of the control mechanism and thereby cause the drive means to return to the neutral position, thus ending further axial displacement of the output member. In this manner the extent of the axial movement of the output member is related to and is controlled by the magnitude of initial force imparted to the drive means by the control mechanism.

In some instances it is possible that the thrust output member may be required to overcome an external resistance of such a magnitude that the maximum torque available from the driven shaft of the friction drive apparatus would be exceeded. In such a case, a condition of slip of the rollrings or other drive means on the conical shafts could occur. Such slippage is quite likely to cause considerable damage to the friction drive apparatus, and it is accordingly another object of this invention to include a thrust-limiting mechanism in friction drive apparatus incorporating planetary gear and worm gear torque converting mechanisms as aforesaid.

Such thrust-limiting mechanism senses the buildup of the output thrust, and upon a thrust of predetermined magnitude being obtained, the thrust-limiting mechanism is effective to return the drive rings to a neutral position at the mid portions of the conical shafts and thereby prevent the development of additional thrust in the torque converting mechanism. In this manner the possibility of the devolpment of any such excessive thrust output as could cause the above-described condition of slip of the driving rings on the conical shafts is obviated. Such thrust-limiting structure may take the form of a resiliently biased and axially movable member, the axial movement of which is dependent upon the magnitude of the output thrust developed, and a fork member shiftable by axial movement of the axially movable member and connected to the rollring or other drive means through a lost motion connection. In this form of the invention an output thrust of a predetermined magnitude is effective to shift the fork member to a position wherein the fork member engages the rollrings or other drive means and tilts the rollrings or other drive means in a direction to return the rings to the above-described neutral position and thus limit the thrust output of the torque converting mechanism, regardless of the axial displacement of the output member as called for by the control mechanism.

Other and further objects of the present invention will be apparent from the following description and claims and are illustrated in the accompanying drawings which, by way of illustration, show preferred embodiments of the present invention and the principles thereof and what are now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a plan view, partly in section, of one form of a friction drive apparatus constructed in accordance with one embodiment of the present invention and incorporating a planetary gear torque multiplying mechanism;

FIG. 2 is a fragmentary view in side elevation of a control mechanism, mounted on a sliding support, which can be used with different forms of the friction drive apparatus illustrated in various figures of the drawings;

FIG. 3 is a fragmentary view in side elevation of another control mechanism, mounted on a fixed support, which can be utilized with various forms of the friction drive apparatus of the present invention;

FIG. 4 is a plan view, partly in section, of another form of a friction drive apparatus constructed in accordance with the present invention and incorporating a worm gear torque converting mechanism;

FIG. 5 is a plan view, partly in section, of another form of a friction drive apparatus constructed in accordance with the present invention and incorporating a thrust-limiting device which includes an axially slidable helical gear;

FIG. 6 is a plan view, partly in section, of another form of a friction drive apparatus constructed in accordance with the present invention and incorporating a thrust-limiting device which includes an axially movable worm drive shaft;

FIG. 7 is a fragmentary elevation view of a third form of a control mechanism which can be utilized with various forms of the friction drive apparatus of the present invention;

FIG. 8 is an end end elvation view in section of one form of a deck assembly which may be utilized in the friction drive apparatus of the present invention;

FIG. 9 is an elevation view of another form of a deck assembly;

FIG. 10 is a bottom plan view of the deck assembly illustrated in FIG. 9;

FIG. 11 is a top plan view of a rollring arrangement incorporated in a deck assembly illustrated in FIG. 12;

FIG. 12 is an elevation view of another form of a deck assembly which may be utilized in the friction drive apparatus of the present invention;

FIG. 13 is a top plan view of a deck member incorporated in the deck assembly illustrated in FIG. 12;

FIG. 14 is a fragmentary view in side elevation of another form of a control mechanism, which is especially adapted for use with the deck assembly illustrated in FIG. 12;

FIG. 15 is a plan view, taken substantially along the line indicated by the arrows 15—15 in FIG. 17, of another form of a friction drive apparatus constructed in accordance with the present invention and incorporating a screw spindle and nut torque converting mechanism;

FIG. 16 is a plan view, partly in section, of the friction drive apparatus illustrated in FIG. 17;

FIG. 17 is an elevation view taken substantially along the line indicated by the arrows 17—17 in FIG. 16; and FIG. 18 is an elevation view taken substantially along the line indicated by the arrows 18—18 in FIG. 16.

One form of a friction drive apparatus constructed in accordance with the present invention is illustrated in FIG. 1 and is indicated generally by the reference numeral 21. The friction drive apparatus 21 comprises two principal components—a rollring drive mechanism 22 and a torque multiplying and converting mechanism 23—both mounted within an outer frame or housing 24. The rollring mechanism 22 is basically the same as that illustrated and described in the co-pending application of Joseph M. Davin and Hans A. Hug, Serial No. 841, filed January 6, 1960, and reference may be had to this application for details of the structural features and mode of operation of the rollring mechanism.

As illustrated in FIG. 1, the rollring drive mechanism 22 comprises a pair of parallel disposed shafts 26 and 27 which include complemental but oppositely arranged conical portions. Thus, the large diameter end of the conical portion of the shaft 26 is immediately adjacent the small diameter end of the conical portion of the shaft 27, and vice versa. The shafts are journalled for rotation within bearings 28, 29, 31 and 32. The bearing 28 is supported from the base of the frame 24 while the bearings 29 and 31 are mounted within suitable openings formed in a web 33 extending across the interior of the frame 24. However, the bearing 32 is adapted to be shiftable to a limited extent by a coiled compression spring 34 to bias the conical shaft 27 toward the shaft 26 for a purpose which will become apparent hereinafter.

Each of the shafts 26 and 27 is encircled by respective rollrings 36 and 37, which are of somewhat larger internal diameter than the maximum diameter of the largest ends of the conical portions of the shafts 26 and 27. The rollrings 36 and 37 are mounted for rotation in a deck member 39. The portions of the rollrings disposed between the shafts 26 and 27 are pressed into engagement with one another and with the shafts 26 and 27 by the bias exerted on the bearing 32 by the coiled compression spring 34 noted hereinabove. Thus, the rollring 36 is frictionally engaged with the shaft 26 as indicated by the reference numeral 41 while the rollring 37 is engaged with the shaft 27 as indicated by the reference numeral 42. The rollrings 36 and 37 thus comprise drive means interconnecting the shaft 26 for drive with the shaft 27, which in turn is rotated by a suitable prime mover, such as an electric motor 43.

In this regard it may be noted that drive means other than the rollring arrangement illustrated may be utilized for effecting such drive between the shafts 27 and 26. Thus, by way of example, a double roller could be interposed between the shafts 26 and 27. However, encircling rollrings like the rollrings 36 and 37 are preferred inasmuch as such rollrings enable a quite effective frictional engagement between the shafts and rollrings to be obtained, as pointed out in detail in co-pending application Serial No. 842 noted hereinabove.

The rollrings are tiltable about an axis X—X passing through the areas of engagement 41 and 42 of the rings with the shafts and are preferably contained within a deck member or housing 39.

Various forms of a deck member or housing may be utilized in the friction drive apparatus illustrated in FIG. 1 as well as in different forms of the friction drive apparatus to be described hereinafter with reference to other figures of the drawings. Three different forms of the deck member or housing are illustrated in respective FIGS. 8, 9 and 12 wherein like reference numerals designate like parts. In FIG. 8 there is illustrated in sectional elevation one specific form of a deck member construction which can be utilized in the drive mechanism of FIG. 1. Thus, the deck member 39 may be formed with an enlarged central opening 46 adapted to receive the rollrings 36 and 37 therein. The rollring 36 may preferably comprise a double flanged peripheral construction, of which one flange 47 is illustrated in FIG. 8. The width of the rollring 37 is such that the rollring 37 is receivable between the flanges of the rollring 36 to thereby insure accurate axial alignment of the rollrings with respect to one aonther. The deck member 39 may also preferably include flanged roller guide members 48 mounted for rotation within recesses formed in the corners of the deck member 39. In this manner, the rollrings and deck member are adapted to be tilted as a unit about the axis X—X passing through the areas of engagement 41 and 42 with the shafts 26 and 27. The deck member 39 may also include a pivot pin 49 mounted for rotation within a bearing 51. A second pin or stud member 52 may be affixed to the deck member 39 on the axis of tilt X—X and at the end opposite that mounting the pivot pin 49. This deck member construction is the same as that illustrated and described in greater detail in co-pending application Serial No. 841 noted hereinabove, and, as pointed out in that application, the pin or stud 52 facilitates the connection of tilt control mechanism to the deck member 39.

In FIGS. 9 and 10 there is illustrated another form of a deck housing assembly which may be utilized in the various forms of the friction drive apparatus of the present invention. As illustrated in FIGS. 9 and 10 a deck member 39 is formed with an enlarged circular-shaped opening 50 in one portion thereof and a second circular-shaped opening 60 in another portion thereof. The deck member 39 is also formed with an opening 55 which forms a throat interconnecting the circular openings 50 and 60. The diameter of the opening 60 is somewhat larger than the largest external diameter of a flanged rollring 36 so that the rollring 36 may be positioned within the opening 50 and thereafter shifted toward the throat 55, whereupon the flanges 47 are engaged with and are slidable on the opposed laterally extending surfaces of the deck member 39, as illustrated in FIGS. 9 and 10. The diameter of the opening 60 is however substantially the same as the external diameter of the rollring 37. End plates 25 are suitably affixed to the deck member 39, as by the socket head bolts and elastic stop nuts illustrated, and serve to maintain the rollring 37 in lateral alignment within the deck member 39. Thus, with the double-flanged rollring 36 shifted to the position illustrated in FIGS. 9 and 10, the portion of the rollring 37 opposite that engaged by the end plates 25 is interlocked between the flanges 47 of the rollring 36. In this manner, the peripheries of the rollrings 36 and 37 may be frictionally engaged with one another within the throat 55 and the rollrings and deck member 39 are tiltable as a unitary assembly about the axis X—X. For facilitating such tilting of the rollrings and deck member 39 a lever member 30 is suitably affixed to the deck member 39 as by bolts 35.

In FIGS. 11–13 there is illustrated another form of a deck housing assembly constructed in accordance with the present invention. In this form of the deck housing assembly, the double-flanged rollring 36 is adapted to interlock with a rollring 37, as best illustrated in FIG. 11. In this instance a quite simplified deck mechanism 39' is formed with a pair of arcuate-shaped flanges 65 which are adapted to engage the opposed lateral surfaces of the rollring 37 on the lower part thereof in the manner illustrated in FIG. 12. The deck member 39' also is formed with an arcuate recess 70 in the upper surface of one end thereof, and this end of the deck member 39' is adapted to be received between the flanges 47 of the rollring 36. A flexure member 30' is suitably attached to the deck member 39' for facilitating tilting of the rollrings and deck member 39' about the axis X—X illustrated in FIG. 12.

With general reference to FIGS. 8, 9 and 12, it may be noted that the rollrings and deck housing assemblies may be tilted about the axis X—X by forces applied to the upper or lower or even the side portions of the deck members 39. Thus, flexibility in the mounting and attachment of the various forms of control mechanisms of the friction drive apparatus of the present invention is thereby achieved.

The speed of rotation of the shaft 26 is dependent upon the axial position of the rollrings and deck member 39 on the conical portions of the shafts 26 and 27. In FIG. 1 the rollrings and deck member are illustrated in a neutral position wherein the rollrings are disposed midway between the ends of the conical portions. In this neutral position the rollrings 36 and 37 act through equal radii 26R and 27R with respect to the center lines of the shafts 26 and 27 so that the shaft 26 is rotated at the same speed as the shaft 27. As will become more apparent hereinafter, in the neutral position the rollring drive mechanism does not yield any axial output of an output member 72, which output member forms a part of the torque converting mechanism 23.

So long as the deck 39 and the rollrings 36 and 37 are maintained perpendicular to a plane passing through the center lines of the shafts 26 and 27, the areas of engagement of the rollrings with the shafts traverse a circular path about the periphery of the conical portions of the shafts. Thus, with the rollrings 36 and 37 in the neutral position illustrated in FIG. 1, the shafts 26 and 27 rotate at the same speed. However, should the deck member 39 and the rollrings 36 and 37 be tilted about the axis X—X passing through the areas of engagement of the rollrings and the shafts, the areas of engagement of the rollrings with the shafts are caused to traverse helical paths on the conical portions of the shafts 26 and 27, and the rollrings and deck member 39 are moved axially of the shafts to thereby vary the relative rotational speeds of the two shafts.

Any suitable apparatus may be utilized for effecting such tilting of the rollrings and deck member. In FIG. 1 a control mechanism 56 for accomplishing such tilting is schematically illustrated. Such control mechanism 56 includes both an actuator 57, which may be of an electrical, pneumatic, mechanical or hydraulic nature, and linkage means 58 interconnecting the deck member 39 and the actuator 57. Any one of the several forms of control mechanisms illustrated in FIGS. 1, 3, 7 and 14 may be incorporated in the friction drive apparatus illustrated in FIG. 1, and details of the construction of the control mechanisms illustrated in FIGS. 1, 3, 7 and 14, as well as the manner in which these control mechanisms are associated with component parts of the friction drive apparatus 21, will presently be described in greater detail.

In accordance with the present invention the speed differential between the shafts 26 and 27, as obtained by movement of the rollrings and deck from the neutral position illustrated, is utilized to convert the relatively low torque output of the shafts to an output thrust of large magnitude in an axially movable output member. In the form of the invention illustrated in FIG. 1 the means for accomplishing this result comprise the mechanism 23 noted generally hereinabove and include planetary gear means 61 and a power screw 62. As illustrated in FIG. 1, a sun gear 63 is fixed for rotation with the shaft 26 while a planet gear carrier housing 64 is geared for rotation with the shaft 27. That is, the housing 64 is provided with an external gear 60 disposed in meshing engagement with a spur gear 65 mounted on the outboard end of the shaft 27. Planet gears 66, carried by the carrier 64, mesh with the sun gear 63 and a ring gear 67. The ring gear 67 is formed integrally with a rotatable shell 68, which is journalled for rotation within one end of the frame 24 by bearings 69. The shell 68 includes a radially inwardly extending web 71 having screw threads formed on the inner periphery thereof and engageable with complementary threads formed on an output member 72. The output member 72 is in turn supported for slidable movement within a bearing 73 mounted in an end wall of the frame member 24. In the operation of the apparatus thus far described any differential between the speeds of rotation of the output shafts 26 and 27 is effective to impart rotation movement to the ring gear 67 in a direction dependent upon the relationship of the speed of the shaft 26 to that of the shaft 27. Thus, if the speed of the shaft 26 is greater than that of the speed of the shaft 27, the ring gear 67 is rotated in one direction, but if the speed of the shaft 26 is less than that of the speed of rotation of the shaft 27, the ring gear 67 is rotated in an opposite direction. Of course, if the shafts 26 and 27 are rotated at equal speeds, as is the case when the deck member and rollrings are in the neutral position described hereinabove, the sun and planet gears of the differential gear means 61 rotate within the ring gear 67 at such peripheral speeds that no rotation is imparted to the ring gear 67. It will be recognized that the effect of any rotation imparted to the ring gear 67 by a speed differential between the shafts 26 and 27 will be to multiply the torque output of the shafts. Thus, the shafts 26 and 27 may be rotated at relatively high speeds at a low torque to produce a high torque at a relatively low speed in the ring gear 67.

The high torque thus made available in the ring gear 67 is further multiplied and converted into an axial thrust in the nonrotatable output member 72 through the threaded connection afforded between the shell 68 and the output member 72.

In accordance with the present invention the axial displacement of the output member 72 resulting from a speed differential between the shafts 26 and 27, as transmitted through the planetary gear 61 and power screw 62, can be controlled as a function of the magnitude of a force initially imparted to the deck member 39 by the control mechanism 56. That is, a desired amount of axial movement of the output member 72 can be obtained by selection of the amount of deck tilting force imparted by the control mechanism 56, and various control mechanisms for accomplishing such a mode of operation will now be described with particular reference to FIGS. 2, 3, 7 and 14.

In FIGS. 2, 3 and 7 parts which correspond to like parts in FIG. 1 are indicated by the same reference numerals but with the addition of the respective suffixes "A," "B," and "C." In FIG. 14 the same reference numerals are used but with the addition of the prime (') mark. Thus, in FIG. 2 the rollring deck member 39A is adapted to be tilted about the axis X passing through the areas of engagement of the rollrings with the shafts 26A and 27A, by an actuator 57A. The actuator 57A may be electrically, pneumatically, mechanically, or hydraulically actuated as noted hereinabove, and includes a flexure strip 58A extending from a movable plunger 82 to the top of the deck member 39A. Actuator 57A is mounted on a support 83, which is in turn mounted for sliding movement within bearings 84 in the frame 24. The support 83 is also connected to the deck member 39A by a flexure strip 86 so that the entire support member 83 and actuator 57A are movable axially with the rollrings and the deck member 39A upon a force being applied by the plunger 82 through the flexure strip 58A to the deck member 39A such as is effective to tilt the deck member 39A about the axis X and cause axial movement of the rollrings and deck member in the manner described hereinabove.

Feed-back means effective to sum up the axial movement of the output member and impart a feed-back force to the deck member 39A and rollring drive means in opposition to the initial tilting force applied by the actuator 57A are also incorporated in the arrangement illustrated in FIG. 2. Such means comprise a spring 87 which is attached at one end to the output member, such as 72, as indicated by the legend in FIG. 2. At its opposite end the spring 87 is connected to the deck member 39A.

The operation of the control mechanism and feed-back arrangement illustrated in FIG. 2 is as follows:

Initially the rollrings and deck member 39A are in the neutral position, which is that position of the deck member 39A with respect to the conical portions of the shafts 26A and 27A which does not yield any axial output of the member 72. In the forms of the invention thus far described this neutral position is at the midportions of the conical shafts wherein the shafts rotate at equal speeds. However, depending upon the manner in which such shafts are connected to drive a torque converting mechanism, it will be understood that such neutral position may be obtained at some position of the deck member with respect to the conical shafts wherein the shafts are rotated at some predetermined ratio of speed other than a one-to-one ratio. In any event, for any one friction drive apparatus, this neutral position is always the same regardless of the axial displacement which may be assumed by the output member 72. In this neutral position the overall friction drive apparatus 21 is in a state of equilibrium. Subsequently, the actuator 57A is energized to impart a first or signal force to the deck member 39A effective to tilt the deck member and rollrings about the axis X and cause the rollrings and deck member to move axially of the shafts 26A and 27A, thus producing a differential between the speeds of rotation of the shafts. As a result of such differential between the rotational speeds of the shafts 26A and 27A, the output member 72 (see FIG. 1) is moved axially in the manner described hereinabove. The resultant axial movement of the output member is summed up and developed as a force in the spring 87 which is fed back to the deck member 39A in opposition to the force imparted by the actuator 57A. Therefore, inasmuch as the output member continues to move so long as the shafts 26 and 27 rotate at the different speeds, the feed-back force by the springs 87 is progressively increased and eventually equals the force applied to the deck member 39A by the actuator 57A. As a result, the deck member 39A is tilted to an inclination opposite that initially imparted by the actuator 57A and the rollrings and deck member 39A are caused to move axially along the shafts 26A and 27A and back to the above-described neutral position. Upon the neutral position being obtained, no further axial movement is developed in the output member 72, and the friction drive apparatus comes to rest at a new condition of equilibrium. Thus, it will be observed that the extent of the axial movement is related to the magnitude of the initial deck tilting force applied by the actuator 57A so that any predetermined axial movement of the output member can be obtained by suitable selection of the input signal supplied to the actuator 57A.

Instead of utilizing a control mechanism adapted for axial movement with the rollrings and deck 39, such as the actuator 57A mounted for movement on the sliding support 83 as described hereinabove, in some instances it may be desirable to mount the actuator at a fixed axial location with respect to the shaft 26 and 27, and such an arrangement is illustrated in FIG. 3. Thus, in FIG. 3 the actuator 57B is mounted in any suitable manner on a portion of the frame 24B and incorporates a plunger 82B connected through a flexure strip 58B to the rollring deck member 39B. Also, in the arrangement illustrated in FIG. 3 a force feed-back spring 87B is connected to the rollring deck member 39B for summing up the movement of the output member and applying a force to the deck member in opposition to the force imparted by the actuator 57B through the flexure strip 81B.

In the operation of the control mechanism 56B illustrated in FIG. 3 energization of the actuator 57B is effective to tilt the rollrings and deck member 39B about the axis X, as indicated by the arrows in FIG. 3. Such titling of the deck member causes the rollrings and the deck member 39B to move axially of the shafts 26B and 27B until the deck member is restored to a perpendicular relationship with a plane passing through the center lines of the shafts 26B and 27B. The resultant differential produced in the speeds of rotation of the shafts 26B and 27B develops such an axial displacement in the output member as is effective to develop a force within spring 87B sufficient to override the initial tilting force of the actuator 57B and cause the rollrings and deck member 39B to return to the neutral position midway of the shafts 26B and 27B.

Other control and feed back mechanisms may be utilized with the friction drive apparatus illustrated in FIG. 1, and in FIG. 7 there is illustrated a control mechanism 56C which utilizes the principles of a proportional triangle servomechanism described in detail in the above-noted copending application Serial No. 841. In the arrangement illustrated in FIG. 7 an actuator 57C of a suitable electric, pneumatic, hydraulic, or mechanical type is connected to effect tilting of the rollrings and deck member 39C through a linkage 58C. The linkage 58C is connected at a fixed angle to the deck member 39C but is slidable within a bearing holder 92 which is reciprocated by the actuator 57C. Thus, the reciprocation of the bearing holder 92 by the actuator 57C causes the linkage 58C to act as a lever for tilting the rollrings and deck member 39C in the direction of the arrows about the axis X. As a result of such tilting of the deck member 39C, the rollrings and the deck member and the linkage 58C move axially of the shafts 26C and 27C, whereupon the linkage 58C slides axially within the bearing holder 92 until the perpendicular relationship of the deck member 39C with respect to a plane passing through the center lines of the shafts 26C and 27C and the original inclination of the link 58C is restored. At this new axial position of the rollrings and deck member 39C the shafts 26C and 27C rotate at different speeds and therefore produce an axial displacement in the output member as described in detail with reference to FIG. 1. The resulting axial movement of the output member is summed up and applied as a feed-back force through a bell crank 93 to the linkage 58C. The force of the spring 87C opposes the force imparted by the actuator 57C and, inasmuch as the spring force progressively increases with increased axial displacement of the output member, the spring force is effective to override the actuator force and cause the rollrings and deck member 39C to return to the neutral position midway of the shafts 26C and 27C after an axial displacement of the output member related to the magnitude of the initial tilting force imparted by the actuator 57C has been obtained.

In FIG. 14 there is illustrated another form of control mechanism. In this instance, the control mechanism is especially adapted to be utilized with the form of the deck housing assembly illustrated in FIGS. 11–13. In FIG. 14 parts which correspond to like parts in the forms of the invention described hereinabove are designated by like reference numerals, but with the addition of the prime mark in FIG. 14. Thus, the control mechanism 56' includes an actuator 57' and a member 58' extends from the actuator 57' and is connected to one end of a shaft 75. The shaft 75 is in turn attached to the flexure 30' of the deck housing assembly. The shaft 75 is supported for axial movement, as between the positions illustrated by the bold and phantom outlines in FIG. 14, by means of a pair of support flexures 40 which are attached to opposite ends of the shaft 75 and which project upwardly from the casing 24' of the friction drive apparatus. A feed-back spring 87' is attached to the output member of the friction drive apparatus, as indicated by the legend in FIG. 14, and is connected to the shaft 75 at an end of the shaft which is opposite that connected to the member 58'. Thus, an input force may be exerted on the deck member 39' by the actuator 57' to tilt the deck member and the rollrings about the axis X and thereby achieve an axial displacement of the output member of the overall friction drive apparatus in the manner set forth in detail hereinabove with reference to the control mechanisms illustrated in FIGS. 2, 3, and 7. The resultant movement of the output member is progressively summed up by the feed-back spring 87' which ultimately applies a force through the shaft 75 to the deck member 39' sufficient to cause the rollrings and deck member to return to the neutral position wherein no further axial displacement of the output member occurs.

Means other than planetary gear and power screw mechanisms may be utilized for converting a differential between the speeds of rotation of the shafts into a multiplied torque and axially directed thrust and exerting such a thrust on a load device. In FIG. 4 there is illustrated a friction drive apparatus which utilizes worm gear mechanism for this purpose. In FIG. 4 parts which correspond to generally like parts in FIG. 1 are designated by the same reference numeral but with the addition of the suffix "D." Thus, the friction drive apparatus 21D comprises a rollring drive mechanism 22D and a torque-converting mechanism 23D disposed within an outer frame or casing 24D. The rollring drive mechanism 22D includes a pair of shafts 26D and 27D having oppositely aligned conical portions as illustrated and mounted parallel to one another. The shaft 26D is journalled for rotation within a bearing 28D mounted within a web 33D extending across the interior of the frame 24D, and a bearing 31D is also mounted within the web 33D for supporting one end of the shaft 27D. Drive means, in the form of a pair of rollrings 36D and 37D, encircle the respective shafts 26D and 27D and are aligned with one another within a deck member 39D. The rollrings 36D and 37D are frictionally engaged with one another and with the shafts 26D and 27D at areas indicated by the reference numerals 41D and 42D by reason of a biasing force exerting by a shaft-loading spring 34D on a bearing 32D supporting the end of the shaft 27D opposite that journalled within the bearing 31D. Thus, rotation of the shaft 27D as by an electric motor 43D causes rotation of the shaft 26D by reason of the frictional drive afforded by the portions of the rollrings interposed therebetween.

As in the arrangement illustrated in FIG. 1, the respective speeds of rotation of the two shafts is dependent upon the axial position of the rollrings and deck member 39D with respect to the shafts, and such axial position can be regulated by a control mechanism 56D which includes an actuator 57D and a connecting member 58D. The control mechanism 56D may preferably comprise one of the arrangements illustrated in FIGS. 2, 3, or 7, although other means for tilting the rollrings or like drive means may be utilized to effect a differential between the speeds of rotation of the shafts 26D and 27D.

In the arrangement illustrated in FIG. 4 the torque converting mechanism 23D incorporates a pair of worms 101 and 102 which mesh with diametrically opposed portions of the periphery of a worm wheel 103. As will become apparent from the description to follow, the worms 101 and 102 rotate in opposite directions and may either cause the center of the worm wheel 103 to move axially in the direction of the arrow A, remain stationary at the position illustrated in FIG. 4, or move axially in the direction of the arrow B depending upon whether the speed of rotation of the shaft 26D is greater than, equal to, or less than that of the shaft 27D. Such resultant movement of the worm wheel is imparted to an output member 104 through a stub shaft 106 affixed to the worm wheel 103.

The worm 101 may be directly connected for rotation with the shaft 26D. Thus, the worm 101 may be suitably mounted at a fixed axial position on an extension of the shaft 26D by any suitable means. As illustrated in FIG. 4 the end of the shaft 26D opposite that journalled within the bearing 28D is supported within a bearing 107.

The worm 102 is adapted to be rotated with and at the same speed as the shaft 27D, and for this purpose the worm 102 is mounted on a shaft 108 connected for rotation with the shaft 27D through a gear train 109. The gear train 109 includes a spur gear 111 suitably affixed to the shaft 27D, an idler gear 112 mounted on a shaft journalled for rotation within a bearing 113 mounted within the web 33D, and a third spur gear 115 affixed to the shaft 108. The pitch diameters of all of these gears are equal so that the shaft 108 rotates at the same speed as the shaft 27D. The shaft 108 is suitably supported for rotation within bearings 114 and 116.

The output member 104, noted hereinabove, may preferably include a pair of guide flanges 117, each of which includes a bearing 118 in the outer end thereof and slidable along the respective shafts 26D and 108. Thus, the flanges 117 serve as guide means along with a bearing 119 in the frame 24D for insuring against tilting or cocking of the output member 104.

In the operation of the friction drive apparatus 21D illustrated in FIG. 4, a differential in the speeds of rotation of the shafts 26D and 27D caused by energization of the control mechanism 56D and axial movement of the rings and deck member 39D from the neutral position illustrated, causes the worms 101 and 102 to rotate at different speeds and thereby produce translatory movement of the center of the worm wheel 103 and the output member 104 in a direction dependent upon the speed of rotation of the shaft 26D with respect to the shaft 27D, as noted hereinabove. It will be recognized that the quite large mechanical advantage afforded by the worm gear mechanism enables the torque of the rollring drive mechanism 22 to be greatly multiplied, and the above-described translatory motion of the worm wheel and the output member 104 is effective to convert such multiplied torque into an axially directed thrust on a load device connected to the output member 104. As in the friction drive apparatus illustrated in FIG. 1, the axial movement of the output member 104 may be summed up through a feed-back mechanism, such as that illustrated in FIGS. 2, 3, and 7 and applied in conjunction with the control mechanism 56D to effect a controlled movement of the output member 104.

In the friction drive apparatus described hereinabove the actual thrust produced within the output member is dependent upon the resistance to axial movement offered by the load device to which the output member is connected. While a quite large output thrust can be obtained from a rollring drive mechanism which itself develops only a small output torque, the maximum available thrust of the output member is, in the final analysis, dependent upon the maximum torque which can be developed by the rollring drive mechanism. Thus, if the output member of the friction drive apparatus should be required to overcome an external resistance exceeding the maximum available thrust of the friction drive apparatus as determined by the maximum torque output of the rollring drive mechanism, such as might happen upon a load device become stuck or locked-up in the course of operation, a condition of slip of the rollrings on the conical peripheries of the shafts can occur. Such slippage can cause considerable damage to the cones.

In accordance with the present invention means are preferably included in the friction drive apparatus for sensing the magnitude of the thrust developed by the friction drive apparatus and applying a force to the rollrings and deck member, or other drive means, effective to cause the rollring drive mechanism to return to a neutral position midway of the shafts 26D and 27D and thereby prevent the development of a thrust in the friction drive apparatus such as would cause slippage between the shafts and rollrings. Two different forms of means for accomplishing such limitation of the output thrust of the friction drive apparatus are illustrated in FIGS. 5 and 6. In FIG. 5 parts corresponding to like parts in FIG. 4 are designated by like reference numerals but with the addition of the suffix "E."

The overall arrangement and mode of operation of the component parts of the friction drive apparatus illustrated in FIG. 5 is like that of the friction drive apparatus illustrated in FIG. 4, with the exception of the drive between the shaft 27E and the shaft 108E now to be described.

In the friction drive apparatus 21E illustrated in FIG. 5 a helical gear 121 is fixed for rotation with a shaft 27E but is axially slidable thereon. Thus, splines or other similar structure, not illustrated, may be utilized for rotating the gear 121 with the shaft 27E. The gear 121 meshes with a gear 122, driven by the electric motor 43E and the gear 122 in turn meshes with a gear 113E fixed for rotation with the shaft 108E. The pitch diameters of the gears 121, 122, and 113E are equal so that the shaft 108E and worm 102E rotate at the same speed as the shaft 127E. The means affording the connection between the gear 113E and the shaft 108E preferably include a clutch 123 comprising an outer housing 124 rigidly affixed to the gear 113E and mounting a band or clutch facing 126 therein. A second clutch facing or band 127 is mounted on the shaft 108E and engaged with the facing 126. Thus, the slip clutch 123 enables the gear 113E to slip with respect to the shaft 108E under certain conditions of operation.

As noted hereinabove, the helical gear 121 is movable axially with respect to the shaft 27E. Normally the helical gear 121 is retained at a selected location on the shaft 27E as by a pair of pre-loaded springs 128 and 129; however, other apparatus can be utilized for this purpose if desired. Thus, a ball and detent mechanism 130 in conjunction with springs 128 and 129 can equally well be utilized.

It is a characteristic of helical gears, as contrasted to ordinary spur gears, that the inclined faces presented by the gear teeth enable an axial thrust to be developed on the gear as a function of the torque transmitted by the gear. Advantage is taken of this characteristic in the arrangement illustrated in FIG. 5 for sensing the development of an output thrust in the output member 104E approaching that critical thrust which can cause slippage of the rings 36E and 37E on the conical surfaces of the shafts 26E and 27E. Thus, as the output thrust of the output member 104E builds up, due to an external resistance presented by the load device, the torque transmitted by the shafts 108E and 26E increases and causes a corresponding increase in the torque transmitted by the helical gear 121. Under normal circumstances the torque build-up is insufficient to cause significant axial movement of the gear 121 from the position illustrated in FIG. 5. However, if the output thrust should exceed a predetermined magnitude, the helical gear 121 is shifted against the bias exerted by the pre-load springs 128 and 129 and ball and detent mechanism 130 to a position wherein the helical gear contacts a shiftable fork 131 which is in turn connected to the deck member 39E. As illustrated in FIG. 5, the shiftable fork 131 is connected to the deck member 39E in the same manner as that of the displacement summing feed-back spring 87E described hereinabove. Thus, the shiftable fork 131, when engaged and moved by the helical gear 121, exerts a force on a deck member 39E in opposition to the initial tilting force imparted by the actuator 57E. As a result, the interaction between the helical gear 121 and the shiftable fork 131 is effective to cause the rollrings and deck member 39E to return to the neutral position midway of the conical portions of the shafts 26E and 27E to thereby limit the thrust output of the output member 104E at a predetermined level less than that which can cause slippage of the rollrings on the conical portions of the shafts 26E and 27E. Such action is obtained even though the output member 104E has not reached an axial displacement sufficient to develop a feed-back force in the spring 87E sufficient to return the rollrings and deck member 39E to the neutral position. While it can be assumed that the shiftable fork 131 tilts the deck member 39E almost instantaneously, some time will elapse until the deck member 39E has completed its follow-up to the neutral position. During this follow-up period, the angular velocities of worms 101E and 102E are not identical, so that output member 104E is urged to travel still further or if the output member is prevented from doing this, there is a build up of a torque level in the rings which would cause them to slip. A slip clutch mechanism 123 is used to equalize the angular velocities of worms 101E and 102E during this follow up of the deck member 39E.

Thereafter, it will be recognized that a signal calling for movement of the output member away from the blocked condition can be introduced in the control mechanism 56E.

In FIG. 6 there is illustrated another embodiment of a friction drive apparatus constructed in accordance with the present invention and incorporating means for limiting the output thrust of the friction drive apparatus. The apparatus illustrated in FIG. 6 is generally similar in construction and mode of operation to that illustrated and described in FIGS. 4 and 5, and like reference numerals, but with the addition of the suffix "F," are utilized to designate like parts.

In the friction drive apparatus 21F illustrated in FIG. 6 a shaft 27F is connected for drive by the motor 43F through gears 141 and 142. At one end the shaft 27F is journalled for rotation within a bearing 32F, which may be spring-loaded like the bearings 32D and 32E illustrated in FIGS. 4 and 5. The opposite end of the shaft 27F may be suitably supported in bearing structure not illustrated in FIG. 6, and a gear 143 is fixed for rotation with the shaft 27F. The gear 143 meshes with an idler gear 144 which in turn meshes with a gear 146 fixed for rotation with the shaft 108F mounting the worm 102F. The width of the gear 146 is sufficient to enable a limited amount of sliding movement of the shaft 108F to be obtained while the gears 144 and 146 are maintained in meshing relation.

The worm 101F, like the worm 101D and 101E illustrated in FIGS. 4 and 5, is mounted on the shaft 26F so as to be rotated at the same speed as the shaft 26F. Thus, the worm 102F rotates at the same speed as the shaft 27F while the worm 101F rotates at the same speed as the shaft 26F, and any difference in the speeds of rotation of the two shafts causes translatory motion of the center of the worm wheel 103F and output member 104F to be obtained.

Thrust-limiting means, indicated generally by the reference numeral 151 and including a fork member 152, are included in the friction drive apparatus 21F. The fork member 152 is mounted for pivotal movement about a fixed fulcrum 153 disposed intermediate the ends thereof and is connected at one end through a lost-motion connection 154 to a depending lug 150 affixed to the connecting member 58F. The opposite end of the fork member 152 is connected for axial movement with the shaft 108F by a link member 155.

Axial movement of the shaft 108F is effective to pivot the fork member 152 about the fulcrum 153 and into engagement with the leg 150 of the connection member 58F and is permitted by reason of a preloaded spring biasing construction acting on the end of the shaft 108F opposite that supported within the bearing 116F. Thus, a bearing 156 is retained in fixed axial position on the shaft 108F as by a pair of snap rings 157 seated within suitable grooves formed on the shaft. The bearing 156 is in turn biased to the normal position illustrated in FIG. 6 as by Bellville spring stacks 158 and 159 acting on the opposite faces thereof and seated against suitable seat structure formed in or attached to the frame 24F.

In the operation of the friction drive apparatus illustrated in FIG. 6 the output thrust developed by the output member 104F is transmitted through the shaft 108F and bearing 156 to a respective spring stack 158 or 159, depending upon the direction in which the output thrust is exerted by the output member. If the resistance offered by the load device to which the output member 104F is connected should approach that which can cause slippage of the rollrings on the conical portions of the shafts 26F and 27F, the reaction thrust developed in the shaft 108F becomes large enough to compress the corresponding spring stack 158 or 159 an amount sufficient to pivot the fork member 152 about the fulcrum 153 and into engagement with the leg 150 of the connecting member 58F. Upon such pivoting of the fork member 152 being obtained, connecting member 58F forces deck member 39F to be tilted at an angle which effects axial movement of the rollrings and deck member to the neutral position midway of the conical portions of the shafts 26F and 27F, whereby further axial movement or increased thrust in the output member 104F is prevented.

In FIGS. 15–18 there is illustrated another form of a friction drive apparatus constructed in accordance with the present invention and incorporating a quite simple screw spindle and nut mechanism for converting a differential between the speeds of rotation of a pair of rotary shafts into an axially directed thrust. In FIGS. 15–18 parts which generally correspond to like parts in the friction drive apparatus illustrated in FIGS. 1 and 4–6 are indicated by like reference numerals but with the addition of the suffix "G."

Thus, and with particular reference to FIG. 16, a friction drive apparatus is indicated generally by the reference numeral 21G and includes a housing or frame 24G. In this instance, the housing may preferably include a lower section 24G fitted with a mating upper section 24G' (see FIG. 17) so that the rollring drive mechanism 22G and torque converting mechanism 23G is completely enclosed therein.

The rollring drive mechanism 22G is basically like that described in the various forms of the friction drive mechanism illustrated in the respective FIGS. 1 and 4–6. Thus, the drive mechanism 22G includes a pair of parallel shafts 26G and 27G having oppositely disposed conical portions encircled by respective rollrings 36G and 37G. The rollrings are mounted for rotation within a deck member 39G, which may be like those illustrated in FIGS. 8–13, as described hereinabove. The inner peripheries of the portions of the rollrings disposed between the shafts are engaged with the shafts, as indicated by the reference numerals 41G and 42G, so as to afford a friction drive between the shafts.

As in the other embodiments of the present invention, the shaft 27G is movable to a limited degree toward and away from the shaft 26G, and suitable biasing means are provided for maintaining firm frictional engagement between the shafts and the portions of the rollrings interposed therebetween. With particular reference to FIGS. 10 and 12, it is seen that one end of the shaft 27G is journalled for rotation within a bearing 31G which, in turn, is mounted in a fixed position within a web 33G extending across the interior of the casing 24G. The bearing 31G is preferably in the form of a thrust bearing incorporating inclined roller elements as illustrated. The opposite end of the shaft 27G is journalled for rotation within a bearing 32G which is in turn mounted within a frame 201. The frame 201 is disposed within a recess 202 formed in one end of the casing 24G so as to be slidable therein. With particular reference to FIG. 18, it is seen that a bracket 203 is formed on the interior of the casing 24G and a bolt 204 extends through suitable openings formed in the bracket 203 and the frame 201. Also, a corner portion of the frame 201 is recessed to form a platform 206 which affords a seat for a stack of Belleville springs 34G or the like interposed between the head of the bolt 204 and the frame 201. Thus, by turning down a nut 207 the spring stack 34G is compressed to exert a force through the bearing 32G on the shaft 27G to bias the shaft 27G toward the shaft 26G and thereby maintain the rollrings 36G and 37G in firm frictional engagement with the conical portions of the respective shafts 26G and 27G.

With continued reference to FIG. 16, it is seen that one end of the shaft 26G is journalled for rotation within a bearing 107G which is in turn mounted within an end wall of the casing 24G adjacent the recess 102. The shaft 27G is further journalled for rotation in a thrust bearing 28G clamped between a collar 211 and a retaining ring 212. The thrust bearing 28G is thus mounted in a fixed position within a second web 213 which extends across the interior of the casing 24G, and the web is effective to seal off the drive mechanism 22G from the torque-converting mechanism 23G to thereby prevent any lubricant from the torque-converting mechanism from contaminating the control mechanism or other operating parts of the drive mechanism.

In this instance, the shaft 26G is connected for direct drive by a suitable prime mover, such as an electric motor 43G. Rotation of the shaft 26G by the motor 43G frictionally drives the shaft 27G through the rollrings engaged therewith, and the speed of rotation of the shaft 27G with respect to the shaft 26G is dependent upon the axial position of the rollrings and deck member 39G along conical shafts, as in the other forms of the present invention. Thus, the shaft 27G may be rotated slower than, at the same speed as, or faster than the shaft 26G depending upon the position of the rollrings and deck member 39G with respect to the conical portions of the shafts, and such positioning of the rollrings and deck member 39G is readily obtained by tilting the rollrings and deck member about the axis X—X by control mechanism presently to be described.

In accordance with the present invention, the portion of the shaft 26G which extends between the web 213 and the end wall of the casing 24G is formed with an external thread so as to afford a screw spindle 216. A nut 217 is threaded on the screw spindle 216 and is formed with a circumferential row of gear teeth 218 disposed between radially extending flanges 219. A gear 221 is mounted on the portion of the shaft 27G extending between the web 213 and the end wall of the casing 24G and meshes with the gear teeth 218 between the flanges 219. The gear 221 is slidable axially on the shaft 27G but is suitably fixed for rotation therewith as by a pin 223 slideable within a slotted guideway 24 formed in the shaft 27G. From the foregoing it will be apparent that the nut 217 is adapted to be rotated in the same direction as the screw spindle 216 by reason of the geared-drive connection to the shaft 27G. The pitch diameters of the gear teeth of the gear 221 and the nut 217 are equal so that the nut 217 rotates at the same angular velocity as the screw spindle 216 whenever the speeds of rotation of the shafts 26G and 27G are the same. However, should the shafts 26G and 27G rotate at different speeds, the nut 217 is caused to move axially on the screw spindle 216 in a direction dependent upon the speed of rotation of the shaft 27G with respect to the shaft 26G.

The friction drive apparatus 21G includes means for transmitting such axial movement of the nut 217 to an output member on the exterior of the casing 24G. Thus, a housing 226 is connected to the nut 217 for axial movement therewith by a ball bearing 227 interposed therebetween. An output shaft 72G projects from a face of the housing 226 and is slidable within a bushing 228 mounted within an opening in an end wall of the casing 24G (see FIG. 17). The outermost end of the output shaft 72G is connected to a crosspiece 229, and a second shaft 231 is attached to the crosspiece and is slidable within a suitable guideway formed within the end wall of the casing 24G. Thus, the double-shaft arrangement afforded by the shaft 72G and 231 minimizes any tendency of the crosspiece 229 to cant and thereby bind the output shaft 72G. The crosspiece 229 may include any suitable structure for facilitating its connection to a load device.

In FIGS. 15 and 17 there is illustrated a preferred form of a control mechanism for positioning the rollrings and deck member 39G axially of the conical portions of the shafts 26G and 27G to achieve the desired differential between the speeds of rotation of the shafts. Such control mechanism is indicated generally by the reference numeral 56G in FIGS. 15 and 17 and includes an actuator 57G. As in the other forms of the present invention the actuator 57G may be of any suitable electrical, hydraulic, pneumatic, or mechanical type and includes a member 58G which is movable toward and away from the actuator 57G in response to a control signal applied to the actuator. In this instance, however, the member 58G is not directly connected to the deck member 39G, but is instead connected to a summing bar 231 adjacent one end thereof. The summing bar 231 is in turn connected to the deck member 39G by a wire rod 232 (see FIG. 15). Thus, as illustrated in FIG. 17, a bar 230 projects upwardly from deck member 39G within a bellows-type of seal 235 and the wire rod 232 is attached to the upper end of the bar 230. A flexure strip 233 connects an end of the summing bar 231 to the casing 24G and affords a fulcrum for pivoting movement of the summing bar about the point of connection to the flexure strip 233.

A feed-back spring 87G is connected to the housing 226, and thus, the output member, and is also connected to the summing bar 231 intermediate the rod 232 and the flexure strip 233. It may be noted that the feed-back spring 87G is contained within a tube 236 which is attached at one end to an upwardly projecting flange 226F of the housing 226. The end of the tube 236 opposite that attached to the flange 226F is slidably disposed within an opening 237 extending through the web 213. The opening 237 is formed with an annular recess in the inner surface thereof, and a suitable seal 238 is disposed therein so as to prevent any seepage of lubricant from the torque-converting mechanism 23G to the area of the control mechanism 56G.

To facilitate initial alignment of the summing bar 231 a trimmer spring 241 is included in the control mechanism 56G. With particular reference to FIG. 15, it is seen that one end of the trimmer spring 241 is seated on an end portion of the summing bar 231 farthest from the fulcrum afforded by the flexure strip 233. The opposite end of the trimmer spring 241 is seated on a suitable spring seat 242 mounted on the casing 24G. From the relative dispositions of the feed-back spring 87G and the trimmer spring 241 illustrated in FIG. 15, it will be apparent that the compressive force exerted by the trimmer spring 241 opposes the tension force exerted by the feed-back spring 87G on the summing bar 231. Thus, by providing for suitable adjustment of the spring seat 242 the force exerted by the trimmer spring 241 can be adjusted to counteract any tendency toward initial unbalance developed by the feed-back spring 87G. Thus, the trimmer spring enables the initial alignment of the summing bar 231 to be readily obtained.

To summarize the operation of the friction drive apparatus illustrated in FIGS. 15–18, the force of the trimmer spring 241 is adjusted to obtain the initial alignment of the summing bar 231 which is effective to maintain the rollrings and deck member 39G in the neutral position wherein the shafts 26G and 27G are rotated at the same angular velocities. In this condition the nut 217 rotates at the same speed as and at a fixed axial position on the screw spindle 216 so that there is no axial movement of the output member 72G. Thereafter an input signal of the desired polarity and magnitude is applied to the actuator 57G to pivot the summing bar 231 about the fulcrum afforded by the flexure spring 233, whereupon the deck member 39G is tilted and is caused to move axially on the conical portions of the shafts 26G and 27G to vary the speeds of rotation of the shafts. The resulting differential in the speeds of rotation of the shafts develops a like differential between the speeds of rotation of the nut 217 and the screw spindle 216 causing the nut 217 to move axially on the screw spindle 216. By reason of the large mechanical advantage obtained by the low pitch of the threads of the screw spindle an axial thrust of quite large magnitude is made available in the nut even though the torque of the shaft 27G is relatively small. The axial movement of the nut 217 is summed up by the feed-back spring 87G and applied to the summing bar 231 in opposition to the force imparted to the summing bar through the flexure piece 58G by the actuator 57G. The force of the feed-back spring 87G progressively builds up and is ultimately effective to move the summing bar 231 in a direction to cause the deck member 39G to return to the neutral position wherein the shafts 26G and 27G again rotate at the same speed. Thus, the amount of axial movement of the output member 72G is controlled in accordance with the magnitude of the input signal applied to the actuator 57G.

Thus, in accordance with this invention a friction drive apparatus incorporating conical elements rotated at relatively high speed but low torque is effective to develop a quite large axial thrust in a mechanism of minimum overall dimension. Also, the axial movement of the output member can be regulated as a function of an input signal applied to the friction drive apparatus so that the friction drive apparatus automatically obtains a state of equilibrium upon the desired axial movement of the output member being completed. Furthermore, the present invention enables the output thrust developed by the friction drive apparatus to be continuously sensed or monitored and incorporates mechanism for automatically limiting the output thrust to prevent internal damage to the friction drive apparatus in the event that the load device to which the friction drive apparatus is connected should present an unexpectedly high resistance.

Thus, while we have illustrated and described the preferred embodiments of our invention, it is to be understood that these are capable of variation and modification, and we therefore to do not wish to be limited to the precise details set forth, but desire to avail ourselves of such changes and alterations as fall within the purview of the following claims.

We claim:
1. In a friction drive apparatus of the kind in which a pair of complemental and oppositely contoured conical shafts are disposed parallel to one another and are interconnected for rotation with one another by drive means engaged with the adjacent surfaces of said shafts and wherein said drive means are tiltable about the areas of engagement with said shafts during rotation of said shafts to cause said drive means to move axially of said shafts and thereby vary the relative rotational speeds of said shafts, torque-converting means for converting a differential between the respective speeds of rotation of said shafts into an output thrust, said torque-converting means including counter-rotating members connected for drive by said conical shafts.

2. In a friction drive apparatus of the kind in which a pair of complemental and oppositely contoured conical shafts are disposed parallel to one another and are interconnected for rotation with one another by drive means engaged with the adjacent surfaces of said shafts and wherein said drive means are tiltable about the areas of engagement with said shafts during rotation of said shafts to cause said drive means to move axially of said shafts and thereby vary the relative rotational speeds of said shafts, torque-converting means for converting a differential between the respective speeds of rotation of said shafts into an output thrust, said torque-converting means including planetary gear means connected for rotation by said shafts and effective to multiply a torque developed by a differential between the respective speeds of rotation of said shafts.

3. A friction drive apparatus comprising a pair of complemental and oppositely contoured conical shafts disposed parallel to one another, drive means engaged with the adjacent surfaces of said shafts and interconnecting said shafts for rotation with one another, means for tilting said drive means about the areas of engagement with said shafts during rotation of said shafts to cause said drive means to move axially of said shafts and thereby vary the relative rotational speeds of said shafts, and torque converting means for developing a torque in response to a differential between the respective speeds of rotation of said shafts, said torque converting means comprising worm gear means including both first and second worms connected for rotation with respective ones of said shafts and a worm wheel meshing with said first and second worms at diametrically opposed portions thereof and movable axially of said worms by a speed differential therebetween.

4. A friction drive apparatus comprising a pair of complemental and oppositely contoured conical shafts disposed parallel to one another, drive means engaged with the adjacent surfaces of said shafts and interconnecting said shafts for rotation with one another, control means for tilting said drive means about the areas of engagement with said shafts during rotation of said shafts to cause said drive means to move axially of said shafts and thereby vary the relative rotational speeds of said shafts, and torque-converting means for converting a differential between the speeds of rotation of said shafts into an output thrust, said torque-converting means including a screw spindle directly driven by one of said shafts, a nut threaded on said screw spindle, and a drive connection between said nut and the other of said shafts.

5. In friction drive apparatus of the kind in which a pair of complemental and oppositely contoured conical shafts are disposed parallel to one another and are interconnected for rotation with one another by drive means engaged with the adjacent surfaces of said shafts such that power supplied to one of said shafts causes rotation of both of said shafts and wherein said drive means are tiltable about the areas of engagement with said shafts from a neutral position, in which neutral position said drive means traverse a circular path on the peripheries of said shafts at predetermined axial positions thereon and said shafts rotate at a predetermined ratio of speeds, to an inclined position, wherein said drive means traverse a helical path on the peripheries of said shafts, to cause said drive means to move axially of said shafts away from said neutral position and thereby vary the relative rotational speeds of said shafts; control means associated with said drive means for imparting a first force to said drive means to achieve a selected amount of tilt of said drive means; torque-converting means driven by said shafts for converting a differential between the respective speeds of rotation of said shafts into an output thrust, said torque-converting means including an output member which is movable axially for transmitting the thrust to a load device; and feed-back means effective to sum up the axial movement of said output member and apply a second force to said drive means in opposition to said first force to return the drive means to said neutral position.

6. A friction drive apparatus as defined in claim 5 wherein said control means are mounted at a fixed axial position with respect to said shafts.

7. A friction drive apparatus as defined in claim 5 wherein said control means are mounted for axial movement with said drive means.

8. In friction drive apparatus of the kind in which a pair of complemental and oppositely contoured conical shafts are disposed parallel to one another and are interconnected for rotation with one another by drive means engaged with the adjacent surfaces of said shafts such that power supplied to one of said shafts causes rotation of both of said shafts and wherein said drive means are tiltable about the areas of engagement with said shafts from a neutral position, in which neutral position said drive means traverse a circular path on the peripheries of said shafts at predetermined axial positions thereon and said shafts rotate at a predetermined ratio of speeds, to an inclined position, wherein said drive means traverse a helical path on the peripheries of said shafts, to cause said drive means to move axially of said shafts and away from said neutral position and thereby vary the relative rotational speeds of said shafts: control means associated with said drive means for imparting a first force to said drive means to achieve a selected amount of tilt of said drive means; torque-converting means including planetary gear means driven by said shafts for converting a differential between the respective speeds of rotation of said shafts into an output thrust, said torque-converting means also including power screw means driven by said planetary gear means, said power screw means including an output member which is movable axially for transmitting the thrust to a load device; and feed-back means effective to sum up the axial movement of said output member and apply a second force, of a magnitude dependent upon the extent of the axial movement of said output member, in opposition to said first force to return the drive means to said neutral position upon the output member obtaining an overall displacement related to the magnitude of said first force.

9. In friction drive apparatus of the kind in which a pair of complemental and oppositely contoured conical shafts are disposed parallel to one another and are interconnected for rotation with one another by drive means engaged with the adjacent surfaces of said shafts such that power supplied to one of said shafts causes rotation of both of said shafts and wherein said drive means are tiltable about the areas of engagement with said shafts from a neutral position, in which neutral position said drive means traverse a circular path on the peripheries of said shafts at predetermined axial positions thereon and said shafts rotate at a predetermined ratio of speeds, to an inclined position, wherein said drive means traverse a helical path on the peripheries of said shafts, to cause said drive means to move axially of said shafts away from said neutral position and thereby vary the relative rotational speeds of said shafts; control means associated with said drive means for imparting a first force to said drive means to achieve a selected amount of tilt of said drive means; torque-converting means including a worm gear having worm members driven by said shafts for converting a differential between the respective speeds of rotation of said shafts into an output thrust, said worm gear including a worm wheel which is movable axially of said shafts by a difference in the speeds of rotation of said worm members for transmitting the thrust to a load device; and feed-back means effective to sum up the axial movement of said worm wheel and apply a second force to said drive means in opposition to said first force to return the drive means to said neutral position.

10. In a friction drive apparatus of the kind in which a pair of complemental and oppositely contoured conical shafts are disposed parallel to one another and are interconnected for rotation with one another by drive means engaged with the adjacent surfaces of said shafts such that power supplied to one of said shafts causes rotation of both of said shafts and wherein said drive means are tiltable about the areas of engagement with said shafts from a neutral position, in which neutral position said drive means traverse a circular path on the peripheries of said shafts at predetermined axial positions thereon and said shafts rotate at a predetermined ratio of speeds, to an inclined position, wherein said drive means traverse a helical path on the peripheries of said shafts, to cause said drive means to move axially of said shafts away from said neutral position and thereby vary the relative rotational speeds of said shafts: torque-converting means driven by said shafts for converting a speed differential between said shafts into an output thrust; and thrust-limiting means for sensing an output thrust of a predetermined magnitude and applying a force to the drive means effective to return the drive means to said neutral position and thereby prevent the development of a thrust in said friction drive apparatus such as would cause slippage between said shafts and drive means.

11. A friction drive apparatus as defined in claim 10 wherein said torque-converting means include a shaft member movable axially against a resilient bias by an output thrust of a predetermined magnitude and wherein said thrust limiting means include a fork member shiftable by axial movement of said shaft member and connected to said drive means through a lost-motion connection so that said fork member is normally spaced from said drive means but is engageable therewith upon the development of said predetermined thrust to impart a force to said drive means effective to cause said drive means to return to said neutral position.

12. A friction drive apparatus as defined in claim 10 wherein gear means interconnect said torque-converting means for drive by one of said shafts, said gear means including a helical gear which is slidable axially upon an output thrust of a predetermined magnitude being developed in said torque-converting means and wherein a fork member is connected by a lost-motion connection to the helical gear and effective to apply a force to the drive means to return the drive means to said neutral position upon said predetermined magnitude of output thrust being obtained.

13. A friction drive apparatus of the kind in which a pair of complemental and oppositely contoured conical shafts are disposed parallel to one another and are interconnected for rotation with one another by drive means engaged with the adjacent surfaces of said shafts such that power supplied to one of said shafts causes rotation of both of said shafts and wherein said drive means are tiltable about the areas of engagement with said shafts from a neutral position, in which neutral position said drive means traverse a circular path on the peripheries of said shafts at predetermined axial positions thereon and said shafts rotate at a predetermined ratio of speeds, to an inclined position, wherein said drive means traverse a helical path on the peripheries of said shafts, to cause said drive means to move axially of said shafts away from said neutral position and thereby vary the relative rotational speeds of said shafts: control means associated with said drive means for imparting a first force to said drive means to achieve a selected amount of tilt of said drive means; torque-converting means driven by said shafts for converting a differential between the respective speeds of rotation of said shafts into an output thrust, said torque-converting means including an axially movable output member for transmitting the output thrust to a load device; feed-back means effective to sum up the axial movement of the output member and apply a second force to said drive means in opposition to said first force to return the drive means to said neutral position; and thrust limiting means for preventing slippage of said drive means on said shafts, said thrust-limiting means being responsive to the thrust developed in said torque-converting means and effective to apply an additional force to said drive means in opposition to said first force to cause the drive means to return to said neutral position upon a predetermined magnitude of thrust being developed in said torque-converting means.

14. In friction drive apparatus of the kind in which a pair of complemental and oppositely contoured conical shafts are disposed parallel to one another and are interconnected for rotation with one another by drive means engaged with the adjacent surfaces of said shafts such that power supplied to one of said shafts causes rotation of both of said shafts and wherein said drive means are tiltable about the areas of engagement with said shafts from a neutral position, in which neutral position said drive means traverse a circular path on the peripheries of said shafts at predetermined axial positions thereon and said shafts rotate at a predetermined ratio of speeds, to an inclined position, wherein said drive means traverse a helical path on the peripheries of said shafts, to cause said drive means to move axially of said shafts and thereby vary the relative rotational speeds of said shafts: control means associated with said drive means for imparting a first force to said drive means to achieve a selected amount of tilt of said drive means; said control means including an actuator for developing said first force, a summing bar mounted for pivoting movement about an end thereof, a first connection between said actuator and said summing bar, and a second connection between said summing bar and said drive means; torque-converting means driven by said shafts for converting a differential between the respective speeds of rotation of said shafts, as developed by such tilting of the drive means into an axially directed thrust, said torque-converting means including an output member which is movable axially for transmitting the thrust to a load device; and feed-back means effective to sum up the axial movement of said output member and apply a second force proportioned to the extent of the axial movement of said drive means to said summing bar in opposition to said first force to return the drive means to said neutral position upon the output member obtaining an overall displacement related to the magnitude of said first force.

15. A friction drive apparatus as defined in claim 14 including trimmer means connected to said summing bar for adjusting initial alignment of said summing bar to position said drive means at said neutral position.

16. A friction drive apparatus comprising a pair of complemental and oppositely contoured conical shafts disposed parallel to one another, drive means engaged with the adjacent surfaces of said shafts and interconnecting said shafts for rotation with one another, said drive means being tiltable about the areas of engagement with said shafts during rotation of said shafts to cause said drive means to move axially of said shafts and thereby vary the relative rotational speeds of said shafts, torque multiplying means for developing a torque in response to a differential between the respective speeds of rotation of said shafts, said torque multiplying means including planetary gear means having a sun gear connected for rotation with one of said shafts, a planet gear carrier connected for rotation with the other of said shafts and carrying a plurality of planet gears, and a ring gear engaged by each of said planet gears, and power screw means for converting the torque developed by said torque multiplying means into a thrust directed axially of said shafts, said power screw means being driven by said ring gear and including an output member which is moved axially by rotation of said ring gear.

References Cited in the file of this patent
UNITED STATES PATENTS

| 657,842 | Venn | Sept. 11, 1900 |
| 1,709,346 | Garrard | Apr. 16, 1929 |
| 2,881,622 | Kraus | Apr. 14, 1959 |
| 2,953,933 | Kashiwara | Sept. 27, 1960 |

DON A. WAITE, *Primary Examiner.*